C. M. REYNOLDS.
Car Coupling.
No. 63,750.
Patented Apr. 9, 1867.
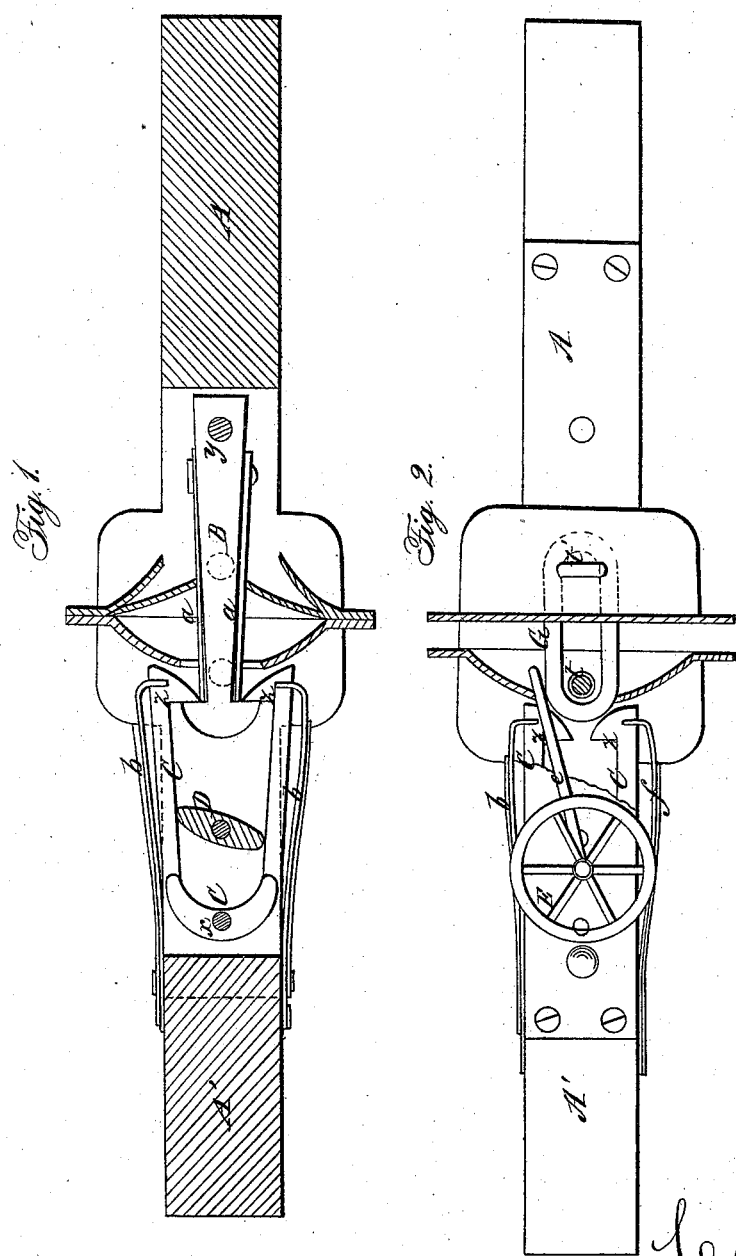

United States Patent Office.

C. M. REYNOLDS, OF CHAMPAIGN, ILLINOIS.

Letters Patent No. 63,750, dated April 9, 1867.

IMPROVED CAR-COUPLING.

The Schedule referred to in these Letters Patent and making part of the same.

TO ALL WHOM IT MAY CONCERN:

Be it known that I, C. M. REYNOLDS, of Champaign city, in the county of Champaign, and State of Illinois, have invented certain new and useful improvements in "Car-Couplings," and do hereby declare that the following is a full, clear, and exact description thereof, reference being had to the accompanying drawings, and to the letters of reference marked thereon, making a part of this specification.

In the annexed drawings, A A' represent the ordinary bumpers attached to the car ends. Within the bumper A' I place two curved metallic bars, C C, pivoted at the curve $x$, and formed with a shoulder, $z\ z$, at the front end. $b\ b$ are two heavy springs attached horizontally at the side of the bumper A', with the ends clutching around the ends of the bars C C. Within the bumper A is placed the draw-head B, which is a straight metal bar, rounded at its end, and having two shoulders there formed. This draw-head is connected to the bumper by a screw or pin, $y$, which may be extracted when desired. $a\ a$ are two parallel springs, extending along the side of the draw-head for guiding it within and out the opposite bumper. D represents a cam, pivoted between the two bars C, and which acts for the purpose of spreading said bars or jaws to admit of the draw-head between them, as seen in fig. 1. This cam is operated by a shaft, having a wheel, E, at its top for the brakesman when on the car platform, and has a stationary rod, $c$, for operating the said cam when the operator is upon the ground. The objects of this invention are the substitution of the draw-head B and bars C C for the link G and pins $t\ t$, and vice versa. I am aware that the bars C C and springs $b\ b$ have been used before for connecting cars. By this device the link may be inserted, as seen in fig. 2, without extracting the jaws C C, but the combination of the jaws C C, their springs, with the draw-head B and its springs $a\ a$, I find to be an effectual and secure coupling.

What I claim as new, and desire to secure by Letters Patent, is—

The arrangement of the bumpers A A', constructed as described, with the jaws C C, springs $b\ b$, and cam D, when used in combination with the draw bar B, provided with springs $a\ a$, and connected to the bumper A by the pin T, as and for the purpose herein specified.

C. M. REYNOLDS.

Witnesses:
C. M. ALEXANDER,
J. M. MASON.